US011950061B2

(12) United States Patent
Nielsen et al.

(10) Patent No.: US 11,950,061 B2
(45) Date of Patent: Apr. 2, 2024

(54) HEARING DEVICE CERUMEN FILTER DEVICE

(71) Applicant: GN Hearing A/S, Ballerup (DK)

(72) Inventors: Henrik Nielsen, Roskilde (DK); Henrik Hetz Christiansen, Copenhagen k (DK)

(73) Assignee: GN HEARING A/S, Ballerup (DK)

( * ) Notice: Subject to any disclaimer, the term of this patent is extended or adjusted under 35 U.S.C. 154(b) by 195 days.

(21) Appl. No.: 17/554,614

(22) Filed: Dec. 17, 2021

(65) Prior Publication Data

US 2022/0109943 A1 Apr. 7, 2022

Related U.S. Application Data

(63) Continuation of application No. PCT/EP2020/067477, filed on Jun. 23, 2020.

(30) Foreign Application Priority Data

Jul. 3, 2019 (EP) .................................... 19184248
Aug. 30, 2019 (EP) .................................... 19194790

(51) Int. Cl.
*H04R 25/00* (2006.01)

(52) U.S. Cl.
CPC .................................. *H04R 25/654* (2013.01)

(58) Field of Classification Search
CPC .......................... H04R 25/654; H04R 2460/17
See application file for complete search history.

(56) References Cited

U.S. PATENT DOCUMENTS 5,970,157 A 10/1999 Yoest
2004/0240694 A1* 12/2004 Wolf ................... H04R 25/654 381/325

FOREIGN PATENT DOCUMENTS

CN 102833643 12/2012
EP 1097606 5/2001

OTHER PUBLICATIONS

PCT International Search Report and Written Opinion for International Appln. No. PCT/EP2020/067477, Applicant GN Hearing A/S, dated Jul. 28, 2020 (12 pages).
Extended European Search Report for EP Patent Appln. No. 19184248.3 dated Dec. 3, 2019.
Extended European Search Report for EP Patent Appln. No. 19194790.2 dated Jan. 2, 2020.
English translation of CN 102833643.

* cited by examiner

*Primary Examiner* — Sunita Joshi
(74) *Attorney, Agent, or Firm* — Vista IP Law Group, LLP

(57) ABSTRACT

A hearing device cerumen filter device is disclosed comprising: a body having a first end and a second end, the body comprising an inner surface defining a cavity, and an outer surface having an outer cross-sectional diameter, where the outer surface comprises a first support member positioned at a first distance from the first end, where the first support member has a first cross-sectional diameter, and the outer surface comprising a second support member positioned at a second distance from the first end, where the second support member has a second cross-sectional diameter; a filter structure positioned within the cavity of the body; and a collar positioned at the second end of the body, the collar having a collar cross-sectional diameter.

20 Claims, 8 Drawing Sheets

HEARING DEVICE CERUMEN FILTER DEVICE

RELATED APPLICATION DATA

This application is a continuation of International Patent Application No. PCT/EP2020/067477 filed on Jun. 23, 2020, which claims priority to European Patent Application No. 19184248.3 filed on Jul. 3, 2019, and European Patent Application No. 19194790.2 filed on Aug. 30, 2019. The entire disclosures of the above applications are expressly incorporated by reference herein.

FIELD

The present disclosure relates to a hearing device cerumen filter device and in particular to a hearing device cerumen filter device to be positioned in an acoustic opening (receiver/microphone opening) of an ear canal part of a hearing device.

BACKGROUND

In-the-ear (ITE) hearing devices are devices that are fully or at least partly positioned inside the user's ear canal, where a receiver/microphone opening of the in-the-ear part is positioned so that the receiver/microphone opening faces the ear drum/ear canal of the user. A common issue with the use of these hearing devices is that ear wax, also known by the medical term cerumen, or other debris may enter the receiver/microphone opening, and may block the acoustic transmission between the receiver and the ear drum and/or between an ear canal cavity and the microphone, or where the ear wax may deter the operation of the receiver and/or microphone.

SUMMARY

Accordingly, there is a need for hearing devices, devices, and methods with improved ear wax filtering capabilities, to prevent ear wax from entering or reaching receiver and/or microphone of the hearing device.

A hearing device cerumen filter device also denoted filter device is disclosed, the hearing device cerumen filter device comprising: a body having a first end and a second end, the body comprising an inner surface defining a cavity, and an outer surface having an outer cross-sectional diameter, where the outer surface comprises a first support member positioned at a first distance from the first end, where the first support member has a first cross-sectional diameter, and the outer surface optionally comprising a second support member positioned at a second distance from the first end, where the second support member has a second cross-sectional diameter; a filter structure, e.g. positioned within the cavity of the body; and a collar positioned at the second end of the body, the collar having a collar cross-sectional diameter. The first support member may be annular.

It is an important advantage of the hearing device cerumen filter device that the device is sufficiently supported inside the receiver opening, and where the support members reduce the risk that ear wax passes between an inner wall of the receiver opening and the outer surface of the body and into the receiver opening.

The present disclosure allows for improved protection from ear wax penetration of the hearing device, as the first support member and the second support members provide a first ear wax barrier and a second ear wax barrier, respectively, when the filter device is positioned inside the receiver opening.

The present disclosure further allows for improved protection from ear wax penetration of the hearing device during change of the filter device.

Further, the first support member and the second support member, that are positioned on the outer surface of the body may also provide an increased stability of the filter device, when the filter device is positioned, e.g. during and/or after insertion, in the acoustic (receiver/microphone) opening. Furthermore, by providing a second support member rigidity of the body of the filter device may be improved, thereby making the filter device more durable and making the body more resistant to deformation during insertion. The provision of a first support member which may be in contact with an inner surface of the receiver opening and a second support member which may be in contact with the inner surface of the receiver opening provide the filter device with at least two regions where the filter device is in contact with the inner surface of the receiver opening.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
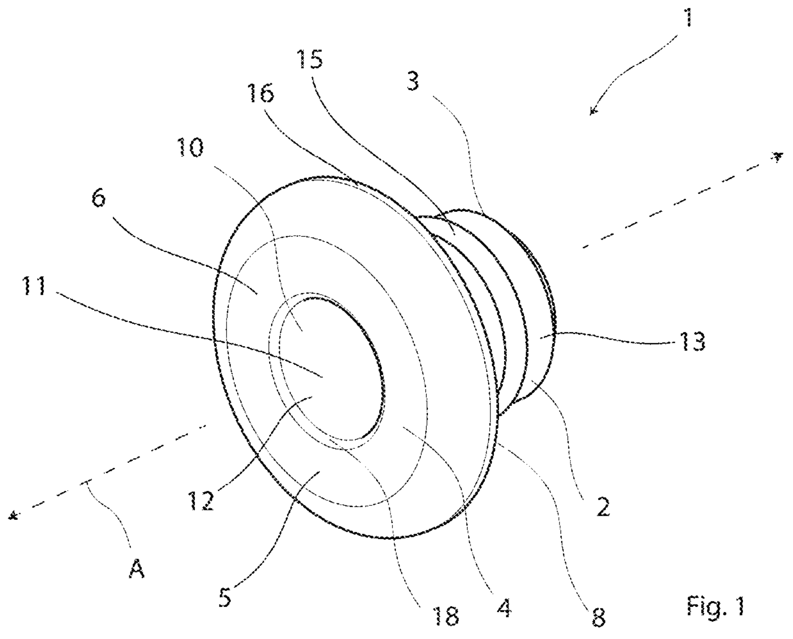
FIG. 1 shows a perspective view of the second end of an exemplary filter device.
Figure 2:
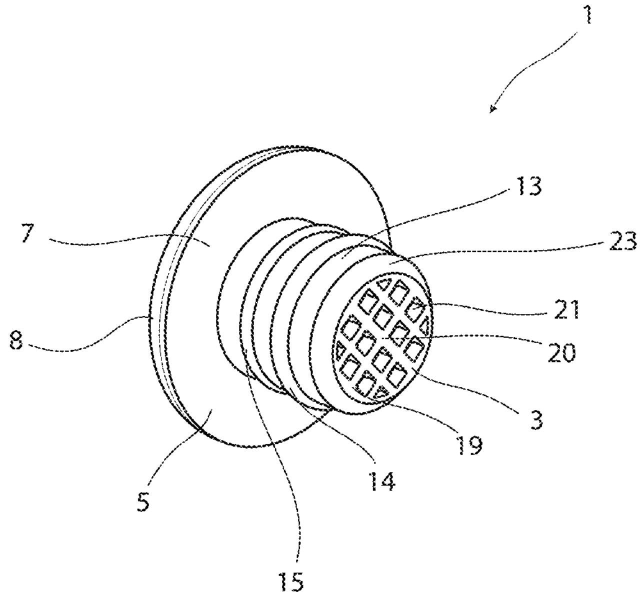
FIG. 2 shows a perspective view of the first end of an exemplary filter device.
Figure 3:
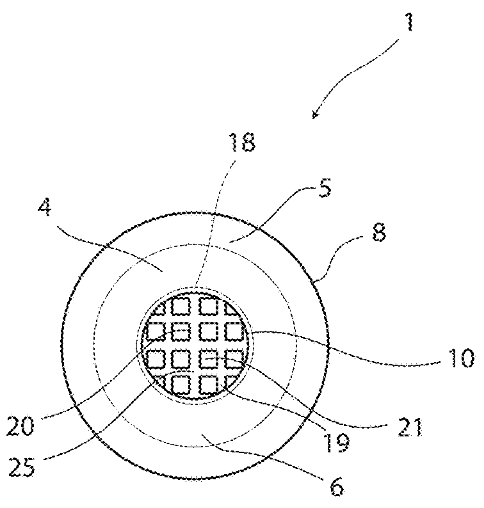
FIG. 3 shows a front view of the second end of an exemplary filter device.
Figure 4:
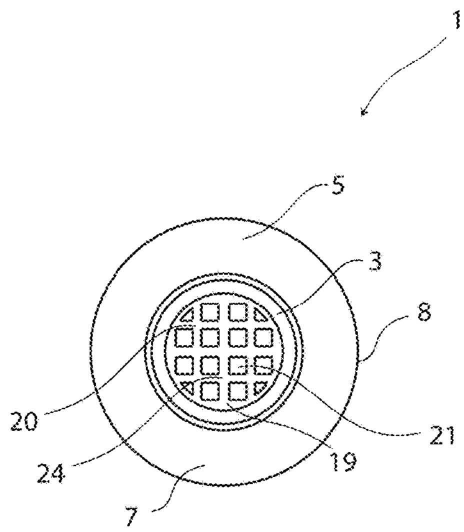
FIG. 4 shows a front view of the first end of an exemplary filter device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device cerumen filter device for a hearing device is disclosed. The hearing device may be a hearable or a hearing aid, wherein the processor is configured to compensate for a hearing loss of a user. The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid.

A hearing device cerumen filter device is disclosed, the hearing device cerumen filter device comprising a body having a first end and a second end, the body comprising an inner surface defining a cavity, and an outer surface having an outer cross-sectional diameter. The outer surface of the body comprises a first support member positioned at a first distance from the first end, where the first support member has a first cross-sectional diameter. The outer surface of the body optionally comprises a second support member positioned at a second distance from the first end, where the second support member has a second cross-sectional diameter. The hearing device cerumen filter, e.g. the body, comprises a filter structure, e.g. positioned within the cavity of the body; and a collar positioned at the second end of the body, the collar having a collar cross-sectional diameter.

As used in this specification, the term diameter and/or cross-sectional diameter means a straight line passing from one area to another area, e.g. through a center of the cross-section, where the diameter may define a size of a specific object or a part.

The hearing device cerumen filter device (also denoted filter device) is adapted to be positioned inside an acoustic opening (receiver/microphone opening), also known as a receiver cavity, of an in-the-ear part of a hearing device, where the filter device is configured to prevent or reduce the risk of ear wax entering the receiver/microphone opening, and thereby reduce contamination of the hearing aid and protect the electrical components, such as the receiver and/or microphone, of the hearing device from damage. The filter device is provided with a filter structure, where the filter structure may be adapted to be positioned within the cavity of the body, such as inside the body cavity and/or to cover and/or close off one end of the body cavity. The filter structure may be in the form of a porous device, which has a plurality of openings adapted to prevent ear wax from being able to pass through the body cavity along its central axis, which thereby prevents the ear wax to enter the receiver/microphone opening and the in-the-ear part of the hearing device while at the same time allowing audio to pass through the filter structure. The filter device may be introduced into the receiver/microphone opening, where the first end of the body is introduced into the receiver opening, and the body is at least partly introduced into the receiver opening.

The first support member and/or the second support member, which are positioned on an outer surface of the body, are positioned in a region that is between the first end and the second end (collar) of the body. The first support member may have a first cross-sectional diameter which is equal to or larger than the diameter of the receiver/microphone opening of the hearing device, so that the first support member may support the body inside the receiver opening. The second support member may have a second cross-sectional diameter which is equal to or larger than the diameter of the receiver/microphone opening of the hearing device, so that the second support member may support the body inside the receiver opening. The cross-sectional diameter of at least one of the support members may be larger than the cross sectional diameter of the receiver opening, so that when the body is positioned inside the receiver opening, the support member comes into contact with the inner surface of the receiver opening, and where the contact is configured to provide a frictional fit between the support member and the inner surface, so that the body is secured by friction inside the receiver opening. The first cross-sectional diameter may be in the range from 1.20 mm to 1.70 mm. The second cross-sectional diameter may be in the range from 1.20 mm to 1.70 mm. The first cross-sectional diameter may be larger than or the same as the second cross-sectional diameter. The first cross-sectional diameter may be less than the second cross-sectional diameter.

The first support member may be annular, i.e. extend along the full periphery of the outer surface of the body. The first support member may be at least semi-annular, i.e. at least extend along half of the full periphery of the outer surface of the body. The first support member may extend at least along a third or at least along a quarter of the full periphery of the outer surface of the body. The second support member may be annular, i.e. extend along the full periphery of the outer surface of the body. The second support member may be at least semi-annular, i.e. at least extend along half of the full periphery of the outer surface of the body. The second support member may extend at least along a third or at least along a quarter of the full periphery of the outer surface of the body.

The outer surface of the body may comprise a plurality of first support members positioned at a first distance from the first end. The outer surface of the body may comprise a plurality of second support members positioned at a second distance from the first end.

The first support member and/or the second support member may be configured to provide a barrier between the hearing device and the filter device, where the support member may be positioned to prevent ear wax to enter the receiver opening between the outer surface of the body and the inner surface of the receiver opening. Thus, if ear wax migrates into the receiver opening outside of the body cavity, the first support member and/or the second support member may be positioned so that the ear wax cannot migrate past the first support member and/or the second support member.

In one or more exemplary filter devices, the first cross-sectional diameter and the second cross-sectional diameter may be larger than the outer cross-sectional diameter. The body may have an outer diameter, where the outer diameter of the body may be equal to or smaller than a receiver opening of a hearing aid, so that the body may be positioned inside the receiver opening, by introducing the first end of the body into the receiver opening. The first support member and/or the second support members may be adapted to have a first and/or a second cross-sectional diameter that is larger than the outer cross-sectional diameter, so that the first support member and/or the second support member may come into contact with the inner surface of the receiver opening (cavity) where the support members may support the body or at least a part of the body inside the receiver/microphone opening.

In one or more exemplary filter devices, the first cross-sectional diameter and the second cross-sectional diameter may be smaller than the collar cross-sectional diameter. The collar may have a collar diameter that is larger than the receiver opening, where the collar diameter of the collar may limit how far the body may be introduced into the receiver opening. Thus, the collar cross-sectional diameter may be larger than both the outer cross-sectional diameter and the first and/or the second cross-sectional diameters, so that the collar cross-sectional diameter acts as a stop at the second end. Furthermore, the collar cross-sectional diameter may also ensure that the collar of the filter device may not be introduced into to the receiver opening, ensuring that the body is the only part of the filter device that may be introduced into the receiver opening. The collar diameter may be in the range from 2.00 mm to 3.00 mm, such as about 2.50 mm.

In one or more exemplary filter devices, the first cross-sectional diameter may be larger than the second cross-sectional diameter. This means that the first cross-sectional diameter of the first support member may provide a first frictional force between the inner surface of the receiver opening, where the first frictional force is larger than the second frictional force of the second support member. The first frictional force may be a predetermined force where the force is sufficient to maintain the filter device inside the receiver opening during use. The second frictional force between the second support member and the inner surface may be relatively low or may be insignificant for the retaining of the filter device inside the receiver opening. The second support member may be adapted to provide a second point of contact inside the receiver opening, to ensure that the filter device is correctly positioned inside the hearing aid, and that the central axis of the filter device and a central axis of the receiver opening are coaxial, when the filter device is inserted.

In one or more exemplary filter devices, the first position may be different from the second position. The first position may be at a first position along the central axis of the filter device, e.g. at a first distance from the first end of the body, while the second position may be at a second position along the central axis of the filter device, e.g. at a second distance from the first end of the body, where the two positions may intersect the central axis at different positions. The first distance may be in the range from 0.3 mm to 0.7 mm. The second distance may be in the range from 0.6 mm to 1.30 mm. The second distance may be 1.5 to 2.5 times longer than the first distance. The provision of a first support member and a second support member at different positions on the outer surface of the body may ensure that you have a first barrier along the outer surface and a second barrier at the outer surface, where ear wax has to pass past one of the barriers in a direction coaxial to the central axis in order to come into contact with the second barrier. Thus, there is a decreased risk that ear wax will enter or go past the receiver opening to come into contact with e.g. the receiver. Thus, there is a reduced risk of ear wax damaging the electrical components of the hearing device.

In one or more exemplary filter devices, the first support member may be positioned a predefined distance from the second support member. The distance may be along an axis that is parallel to the central axis of the filter device. This may mean that even if ear wax will get past one of the support members, it will not come directly into contact with the second support member. Thus, even if there may be a defect in the barrier capabilities of one of the support members the other support member will prevent further advancement of the ear wax. The distance between the first support and the second support member (measured along the central axis) may be larger than 0.20 mm, such as in the range from 0.30 to 0.50 mm.

In one or more exemplary filter devices, the cavity may be a tubular cavity extending from the first end to the second end. The tubular cavity may be defined by the inner wall of the body, where the inner wall of the body may have a length, extending in a direction along the central axis, as well as having a circular, annular or round form (cross-section) along the length of the central axis. The body may be a tubular structure, where the body is hollow and defines the cavity, where the body may be round, circular. The tubular cavity may have an opening in the first end and/or the second end, allowing fluid communication from the first end to the second end, and where the cavity is configured to allow acoustic signals to pass from a second end to the first end. The cavity may have a circular cross-section and may have a diameter or largest extension in the range from 0.70 mm to 1.50 mm In one or more exemplary filter devices, the filter structure may be positioned at a first end of the body. The first end may define a first end of the cavity, where the filter structure may be configured to trap or stop ear wax that may pass from the ear of the user and into the cavity, and where the filter structure prevents the ear wax to pass from inside the cavity and into the hearing aid, when the filter device is inserted into an acoustic opening (receiver opening/microphone opening) of a hearing aid. The second end of the body may be open, where there is full access into the cavity via the second end. By positioning the filter structure in the first end, the filter structure may act as a mechanical stop, which means that if a extractor is inserted into the cavity via the second end, the extractor cannot pass by the filter structure, and the filter structure will thereby provide a mechanical barrier to the first end of the cavity and/or the body.

In one or more exemplary filter devices, the filter structure may comprise a plurality of openings providing fluid communication from the first end of the body and into the cavity. The plurality of openings may be rectangular openings. The plurality of openings may allow sound to pass through the filter device, via the cavity, from a receiver and/or to a microphone inside the hearing aid, where the filter structure substantially does not affect or attenuate sounds and/or audio signals when the sounds pass through the cavity and/or filter structure on their way through the filter structure. The filter structure may be provided with at least 8 or more openings. Some of the openings may be rectangular or squared, and some of the openings may be partly rectangular, where at least two walls defining the opening may be straight walls arranged at right angles to each other. In one or more exemplary filter devices, the filter structure may have at least 12 openings. In one or more exemplary filter devices, the filter structure may have 16 openings or more, e.g. where a first set of openings, such as at least 8 openings or at least 12 openings, are rectangular and/or a second set of openings, e.g. four openings, are partly rectangular. In one or more exemplary filter devices, the openings of the filter structure openings may be circular, annular, polygonal and/or any other closed structure. The filter structure may comprise openings of different shapes, where e.g. the filter structure may comprise rectangular openings as well as round openings and/or triangular openings.

The filter device may be injection moulded in one piece, where the injection mould provides the body, a cavity, a collar, a filter structure and/or a support structure.

In one or more exemplary filter devices, the filter structure may have a filter structure area, where the openings comprise at least 40% of the filter structure area. The filter structure area is an area that comprises openings and filter structure material which defines the openings. The filter structure may be in the form of a mesh shaped structure where a plurality of pillars extends from one part of the inner surface of the body to another part of the inner surface of the body. The filter structure may comprise one or more first pillars that extend in a first direction, and one or more second pillars that are arranged perpendicular to the first pillars. The pillars of the filter structure may be arranged in a direction that is substantially perpendicular to a central axis of the body, where the filter structure as a whole is substantially perpendicular to the central axis and defines a boundary to the cavity at the first end of the body.

In one or more exemplary filter devices, an outer periphery of the collar may be circular, polygonal, or polygonal with rounded corners. The collar may be positioned at the second end of the body, where the collar has an opening, an outer periphery, a first surface facing the first end and a second surface facing the opposite direction (facing the second end of the filter device). The shape of the outer periphery of the collar may have any suitable shape, such as circular, oval, polygonal. The shape of the outer periphery of the collar may be triangular, e.g. with rounded corners. The collar may have a collar cross-sectional diameter or minimum extension which is adapted to be larger than the receiver opening of the housing, preventing the collar from entering the receiver opening.

In one or more exemplary filter devices, the shape of the outer periphery of the collar may be substantially triangular, preferably with rounded corners. In such filter devices, one or more of the sides of the triangular shape may be rounded with a concave and/or convex curvature. And advantage of having the shape of the outer periphery be triangular or substantially triangular is that the collar may be compatible with a wider selection of tools, e.g. pliers, as the sides provide a better grabbing surface than the circular circumference of a collar of circular shape. Furthermore, the sides will be easier to grab by the user using fingers or nails.

In one or more exemplary filter devices, the first end of the body may have or comprise a tapered transition from the outer surface and to the inner surface. The tapered transition may be tapered in the direction inwards towards a central axis of the body, where the tapering may make it easier to insert the first end into the receiver opening, as the outer diameter of the tapering may be equal to or smaller than the cross-sectional diameter of the receiver opening. The inner diameter of the tapering may be smaller than the outer diameter of the tapering, where the inner diameter is smaller than the cross-sectional diameter of the opening. Thus, the inner diameter of the tapering is substantially smaller than the inner cross-sectional diameter of the receiver opening, and the tapering may assist the insertion of the filter device as the first end (the tapering) is smaller than the opening. The angle between the tapered surface and the inner surface may be more than 90 degrees, more particularly more than 125 degrees, while the angle between the tapered surface and the outer surface may be less than 90 degrees, more particularly less than 55 degrees.

In one or more exemplary filter devices, the outer diameter of the tapering may be greater than the outer cross-sectional diameter of the outer surface. The advantage of making the outer diameter of the tapering greater than the outer cross-sectional diameter of the outer surface is that the body is made more rigid near the first end thus providing the body with an improved structural stability, which is particularly useful when the filter structure is positioned near the first end as the increased outer diameter of the tapering while make the body better at withstanding compressions which might damage the filter. A further advantage is that the guiding properties of the tapering section are improved as the increased outer diameter of the tapering section will help centre the filter device in the opening of the hearing aid.

In one or more exemplary filter devices, where the inner surface may have an inner surface length and the outer surface may have an outer surface length, where the inner surface length may be larger than the outer surface length. Thus, the inner surface of the body may have a length that is larger than the surface length of the outer surface of the body. Thus, the inner surface of the body, which defines the cavity, extends from the first end to the second end of the filter device, while the outer surface may extend a shorter distance, or may be interrupted by the collar and/or the tapered surface between the inner surface and the outer surface.

In one or more exemplary filter devices, a transition between the inner surface of the body (forming the cavity) and a second surface of the collar may be rounded. The transition may be positioned at the second end of the body, filter device and/or collar, where the rounding may be the extreme end of the opening into the cavity.

In one or more exemplary filter devices, the collar comprises a first surface, where the first surface may be planar. The planar surface may be flat, and may be perpendicular to the central axis of the body, where the planar surface may face the first end of the body. The planar surface may be adapted to abut to an outer surface of the hearing device, where the planar surface means that a large part of the planar surface is in contact with the hearing device housing, when the filter device is inserted into the acoustic opening. The contact area between the housing and the first surface may ensure that there is less risk that ear wax will pass the peripheral surface of the collar, and travel between the hearing aid housing and the collar and into the receiver opening, when the filter device is inserted into the receiver opening. Thereby, a reduced risk of ear wax entering the acoustic opening during change of the filter device is provided.

In one or more exemplary filter devices, an outer periphery of the collar comprises a peripheral surface area, where the peripheral surface area may be planar and where the plane may be parallel to the outer surface of the body and/or the inner surface of the body. The planar surface area of the peripheral surface of the collar may be rotated around the central axis, and where the surface has a straight axis that is parallel to the central axis of the filter device.

In one or more exemplary filter devices, the peripheral surface area may be connected to a second surface of the collar, where a transitional area between the peripheral surface and the second surface may be rounded. The rounded area may reduce discomfort when the hearing aid is inserted into the ear, as a rounded surface has no sharp edge. The rounding may have a rounding radios of between 0.15 mm and 0.4 mm. The thickness of the collar, i.e. the distance between the first and second collar surfaces may be substantially uniform in the area between the transitional surface and the centre axis A. The width of the transitional surface, i.e. a diameter of the first collar surface minus a diameter of the second collar surface, may be shorter than the outer diameter divided by two minus the collar diameter divided by two, preferably shorter than the outer diameter divided by four minus the collar diameter divided by four.

In one or more exemplary filter devices, the peripheral edge comprises a transitional surface which connects the second collar surface with the first collar surface. The transitional surface comprises a rounded section which provides a rounded edge which will not hurt the user if pressed against a portion of the ear canal. The transitional surface further comprises a flat section which extends substantially parallel, preferably parallel, with the centre axis A, and which connects the first collar surface to the rounded section. The advantage of providing a rounded section is that the peripheral edge is less likely to hurt the user when presses against the ear canal. Further, by providing a flat section, the thickness of the collar at the peripheral edge can be made larger, thus providing the collar with greater stiffness and durability, while also providing a flat surface which can be grabbed by plyers or similar tools in case the filter device is stuck in the hearing device.

The dimensions of the filter device in accordance with one exemplary embodiment may e.g. be as follows. The length of the body may be 1.25 mm, the body cross-sectional diameter may be 1.35 mm, the collar cross-sectional diameter may be 2.50 mm, first cross-sectional diameter may be 1.47 mm, the second cross-sectional diameter may be 1.42 mm. The cross-sectional diameter of the inner surface of the cavity may be 1.0 mm. The length of the collar may be 0.37 mm, the length of the tapering at the first end may be 0.14 mm. The distance between the first support member and the second support member may be 0.27 mm. The radius of the curvature of the first support member may be 0.11 mm, the radius of the curvature of the second support member may be 0.09 mm, the radius of the curvature of the collar may be 0.3 mm. The direction of the lengths disclosed above may be in a direction that is parallel to a central axis of the filter device, where the diameter may be seen in a direction perpendicular to the central axis. The rounding of the corners may be seen in relation to a centre of the curvature, e.g. the rounding.

FIGS. 1-5 show a plurality of views of a filter device 1, where the following description of the drawings will refer to any one of FIG. 1-5. The filter device 1 has body 2 having a first end 3 and a second end 4. The filter device 1 comprises a collar 5, where the collar has a second surface 6, a first surface 7 and a peripheral edge 8, where the peripheral edge 8 has a planar surface 16. At the second end 4 of the filter device 1, the filter device 1 has a second opening 10, where the second opening provides access and/or fluid communication into a cavity 11 of the body 2, where the cavity 11 is defined by an inner surface 12 of the body 2, and has a predefined volume. The filter device may have a central axis A, which extends along the length of the filter device 1.

Figure 5:
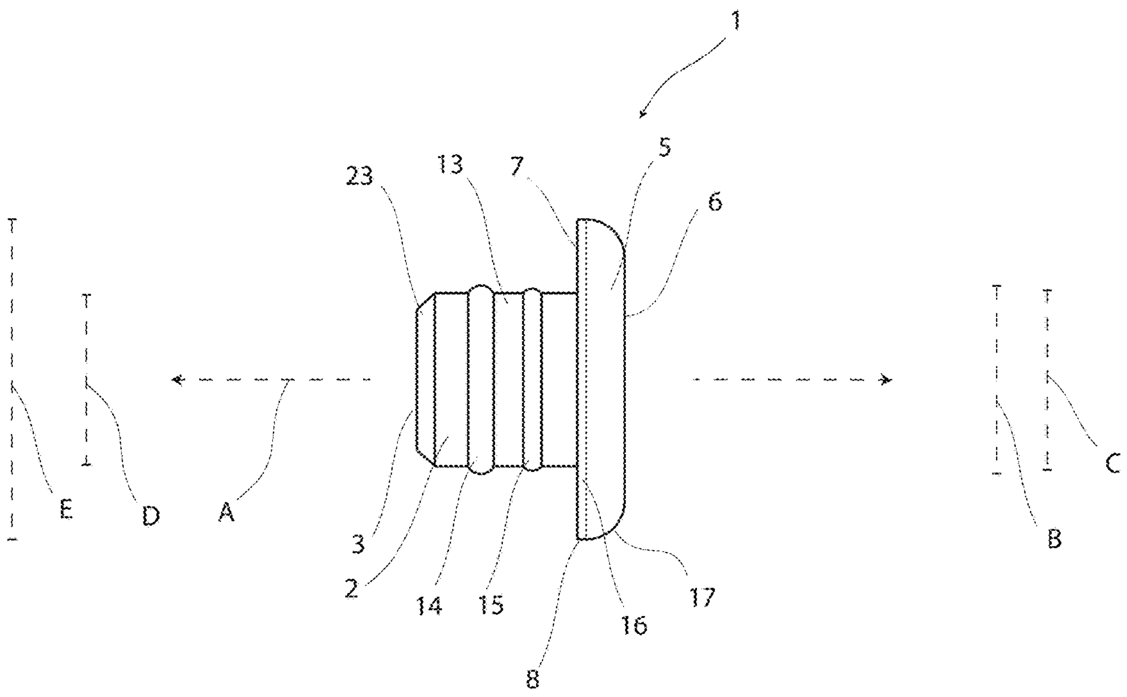
FIG. 5 shows a side view of an exemplary filter device.

The body 2, as seen in FIG. 5, may have an outer surface 13, where the outer surface may define a first support member 14 and a second support member 15, where the first support member 14 and the second support member 15 are positioned along the length of the body 2 at different positions. The first support member 14 may have a first diameter B, and the second support member may have a second diameter C, where the first diameter B is larger than the second diameter C. Thus, when the filter device 1 is inserted into an acoustic opening (not shown) having a diameter that is equal to or larger than the outer diameter D of the body, but smaller than the first diameter B, the first support member 14 will have more contact with the inner surface of the acoustic opening than the second support member, and thereby provide a frictional force to hold the filter device 1 inside the receiver opening of the hearing aid. The second support member 15 may provide a second contact point to the inner surface of the acoustic opening of the hearing device, ensuring that the central axis A of the body 2 aligns coaxial to the central axis of the receiver opening (not shown). The first diameter B may be larger than the second diameter C and larger than the outer diameter D. The second diameter C may be smaller than the first diameter, but larger than the outer diameter D.

The filter device 1 may be provided with a collar 5, where the collar has a collar diameter E. The collar diameter E is larger than the first diameter B, second diameter C, outer diameter D, where the collar is formed in such a manner so that the collar cannot be inserted into an receiver opening of a hearing aid. The collar 5 has a first surface 7 which faces the first end 3 and extends from the outer surface 13 of the body 2 and towards the peripheral edge 8 of the collar 5. The first surface 7 may be planar, where the plane of the collar may be perpendicular to the central axis C, where the planar surface is adapted to abut an outer surface of a hearing aid and provide a seal between the outer surface of the hearing aid and the first surface 7 of the collar. The peripheral boundary 8 of the collar 5 may have a planar peripheral surface 16, where the planar surface 16 is substantially parallel to the central axis A and extends along the entire rim/edge 8 of the collar 5. The collar 5 may have a second surface 6, where the second surface 6 may define a part of the second end 4 of the filter device 1, and may be the outermost part of the filter device along the central axis A. The collar 5 may be rounded at a transitional surface 17, where the transitional surface 17 connects the planar surface 16 and the second surface 6. The second surface 6 may define the second opening 16 into the cavity 11 providing a fluid communication from the outside of the filter device 1. An inner edge 18 of the opening 11 may be rounded.

The filter device 1 may have filter structure 19 positioned at the first end 3 where the filter structure 19 comprises pillars 20 and openings 21, where the openings 21 provide a fluid communication between the outside of the filter device 1 and the cavity 11 via the first end 3. The openings 21 are of such a size that the pillars 20 block ear wax from passing from inside the cavity 11 and via the first end 3 into a hearing aid, when the filter device 1 is mounted in the hearing aid. The filter structure may have openings that cover around 40% of the area 22 of the filter structure 19. In other words, the filter structure may have openings that cover around 40% of the cross-sectional area of the cavity 11. The filter structure may have a first surface 24 and a second surface 25, where the second surface 24 faces the cavity 11 and the first surface 24 faces the outside of the filter device 1. The filter structure 19 may be positioned at the first end 3 of the cavity 11, where the first surface 24 is the terminal end of the body 2. The filter structure 19 may alternatively be positioned outside the cavity 11, closing off the cavity 11.

The first end 3 may comprise a tapered surface 23, which extends between the outer surface 13 of the body 2 and the inner surface 12 of the body.

Figure 6:
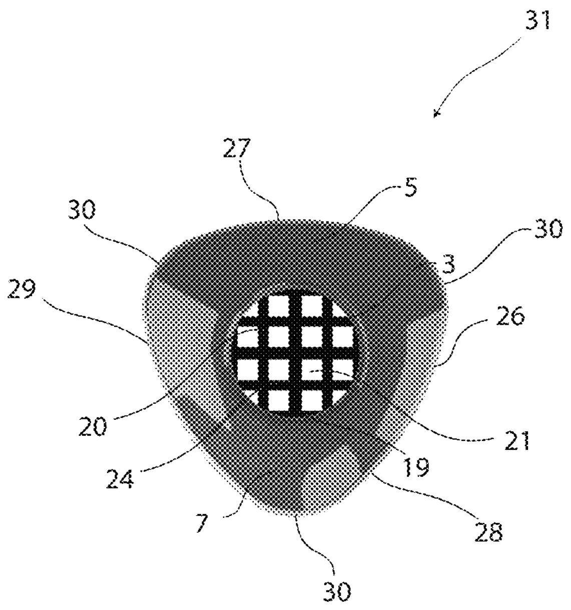
FIG. 6 shows a perspective view of an exemplary filter device.
Figure 7:
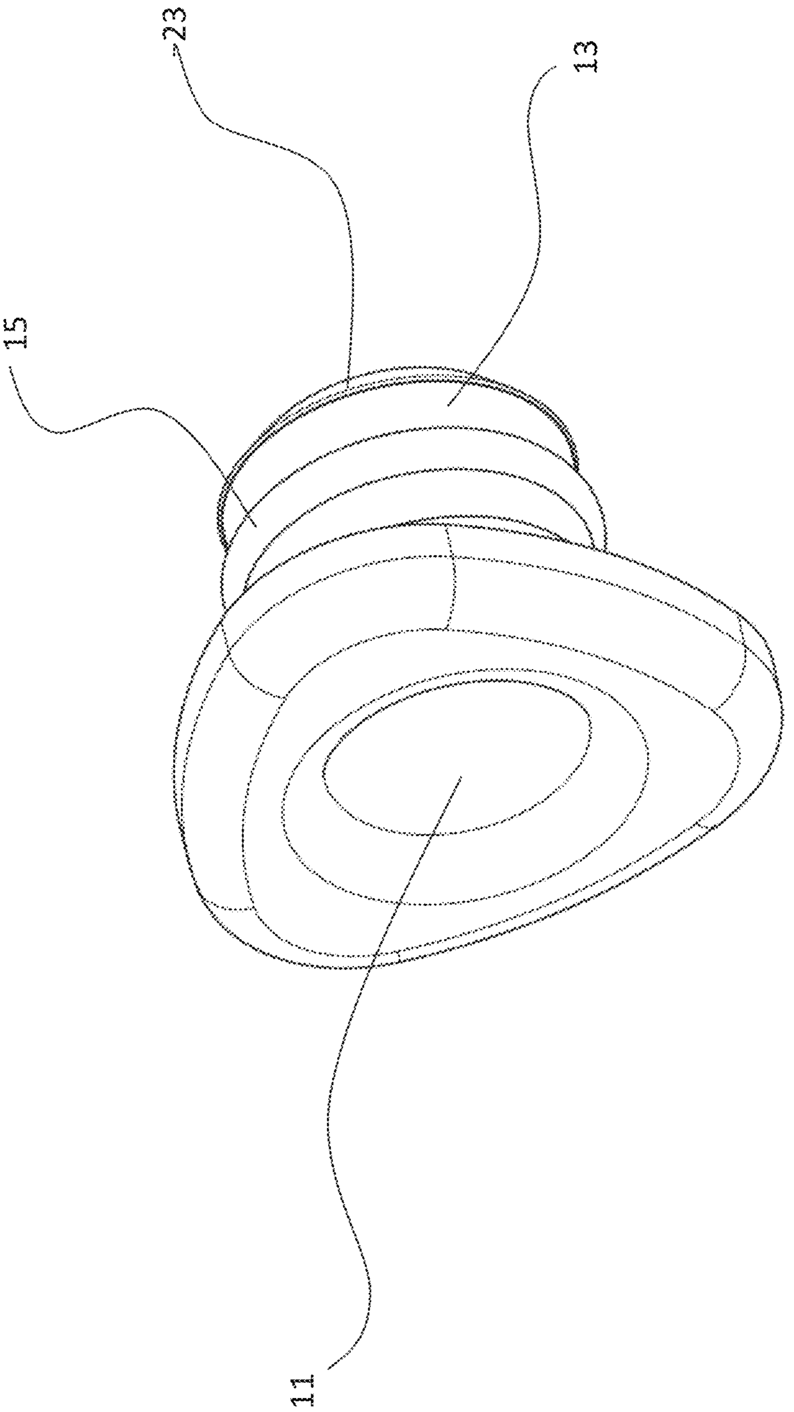
FIG. 7 shows a perspective view of the second end of an exemplary filter device.
Figure 8:
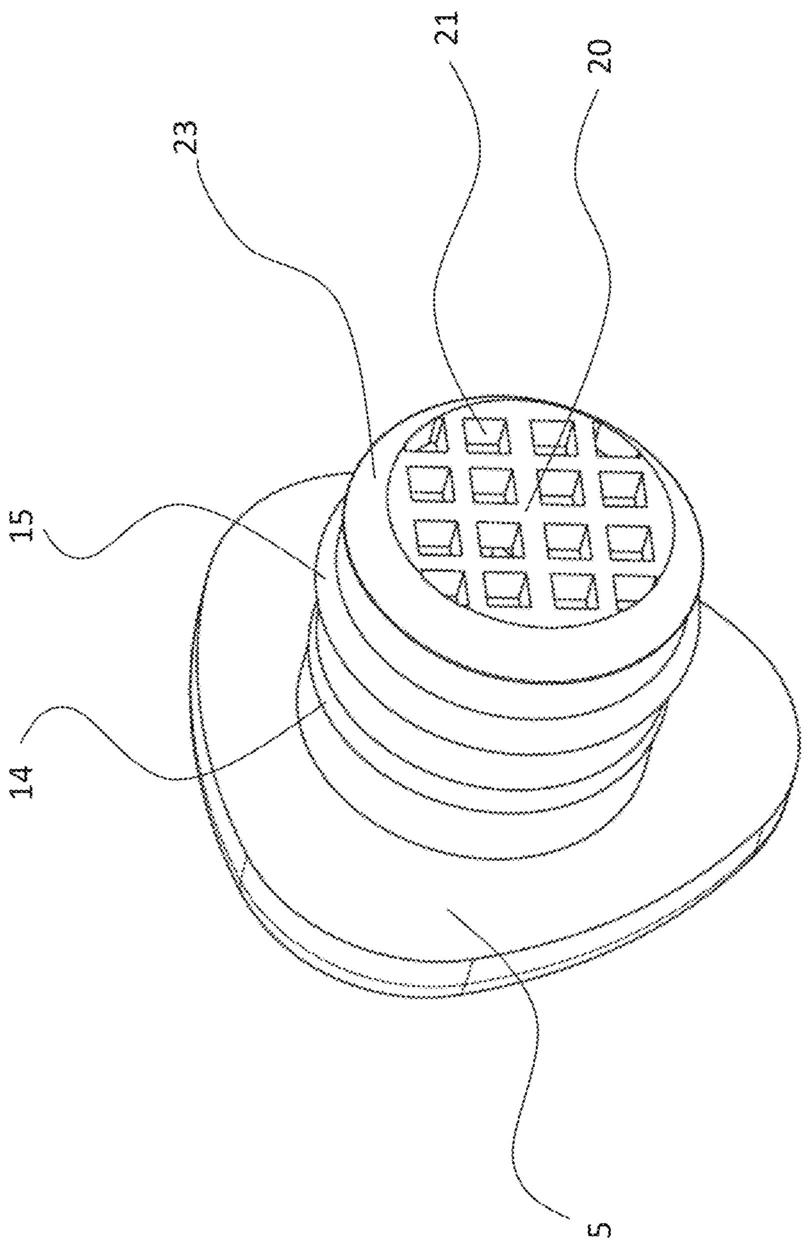
FIG. 8 shows a perspective view of the first end of an exemplary filter device.
Figure 9:
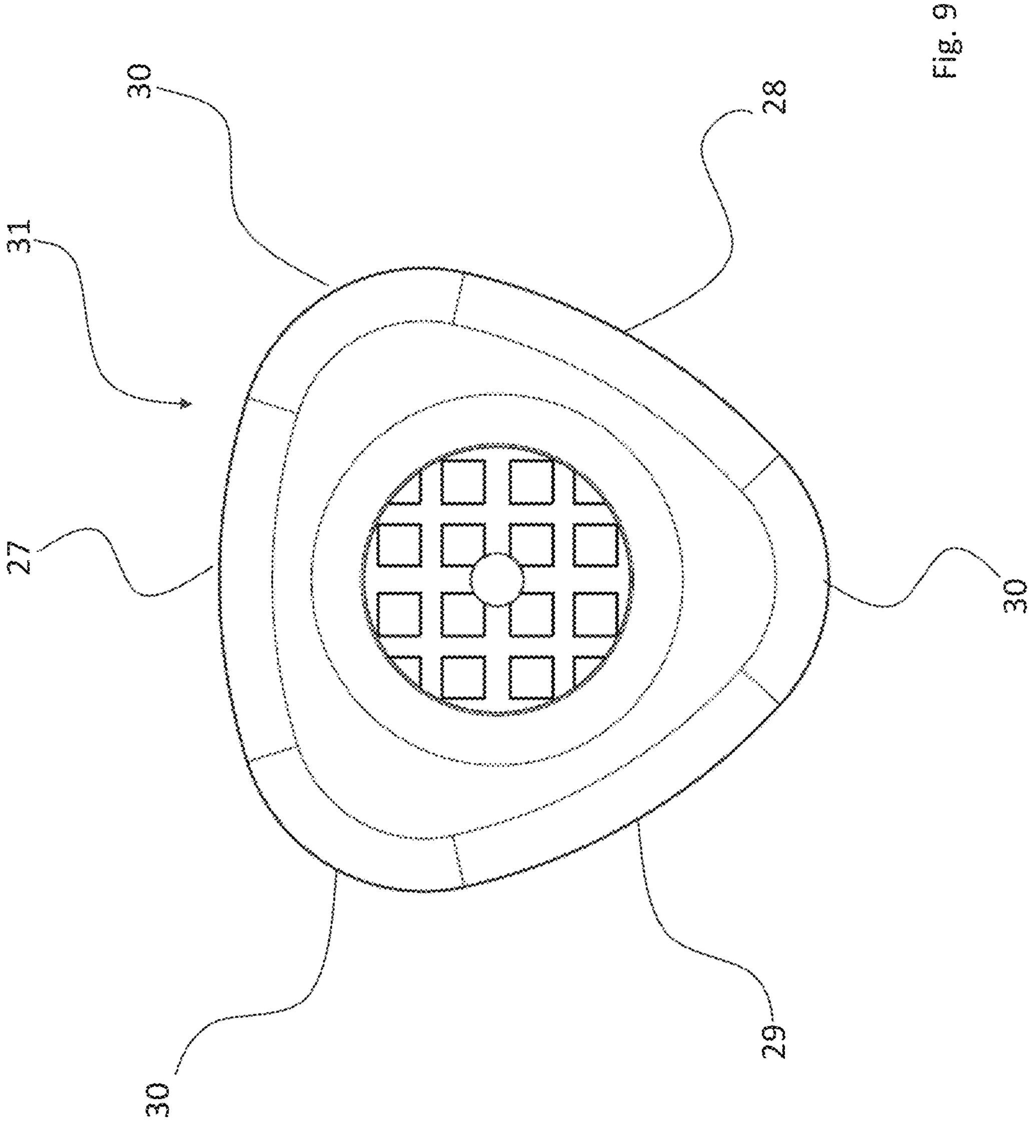
FIG. 9 shows a top view of the second end of an exemplary filter device.
Figure 10:
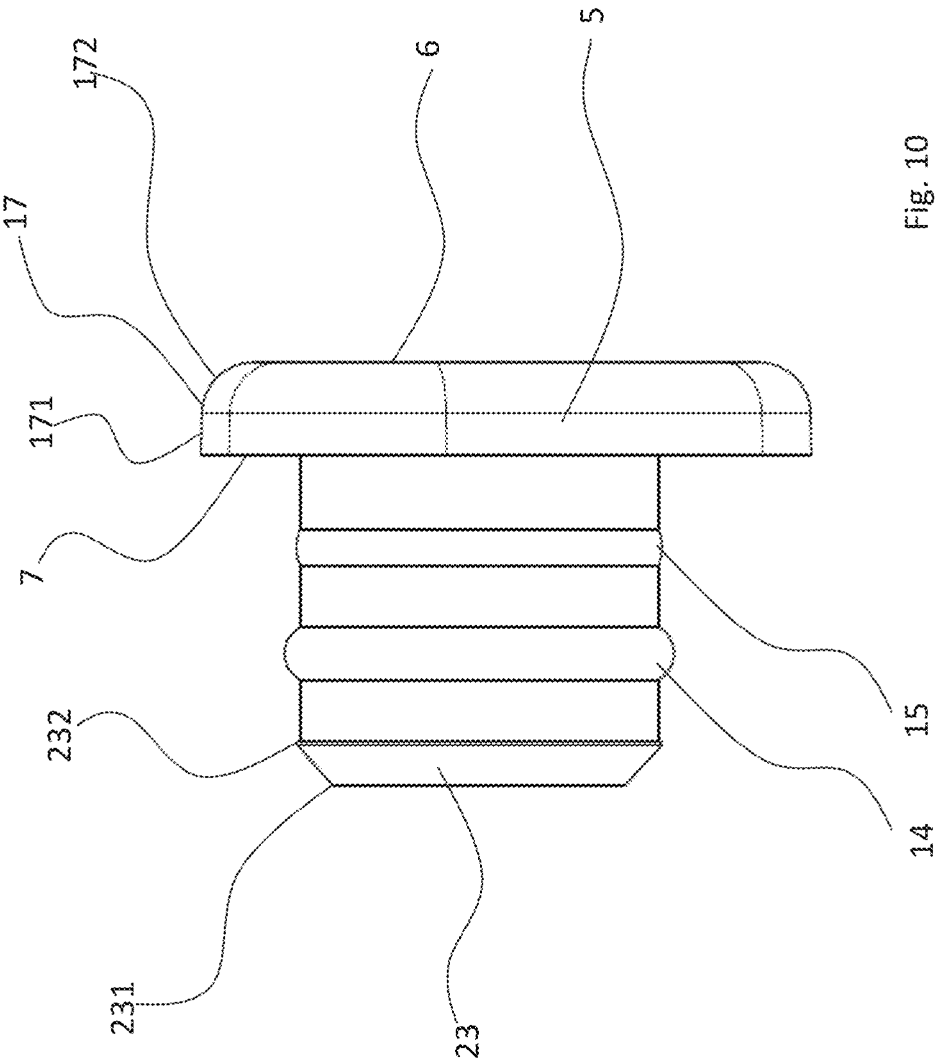
FIG. 10 shows a side view of the first end of an exemplary filter device.
Figure 11:
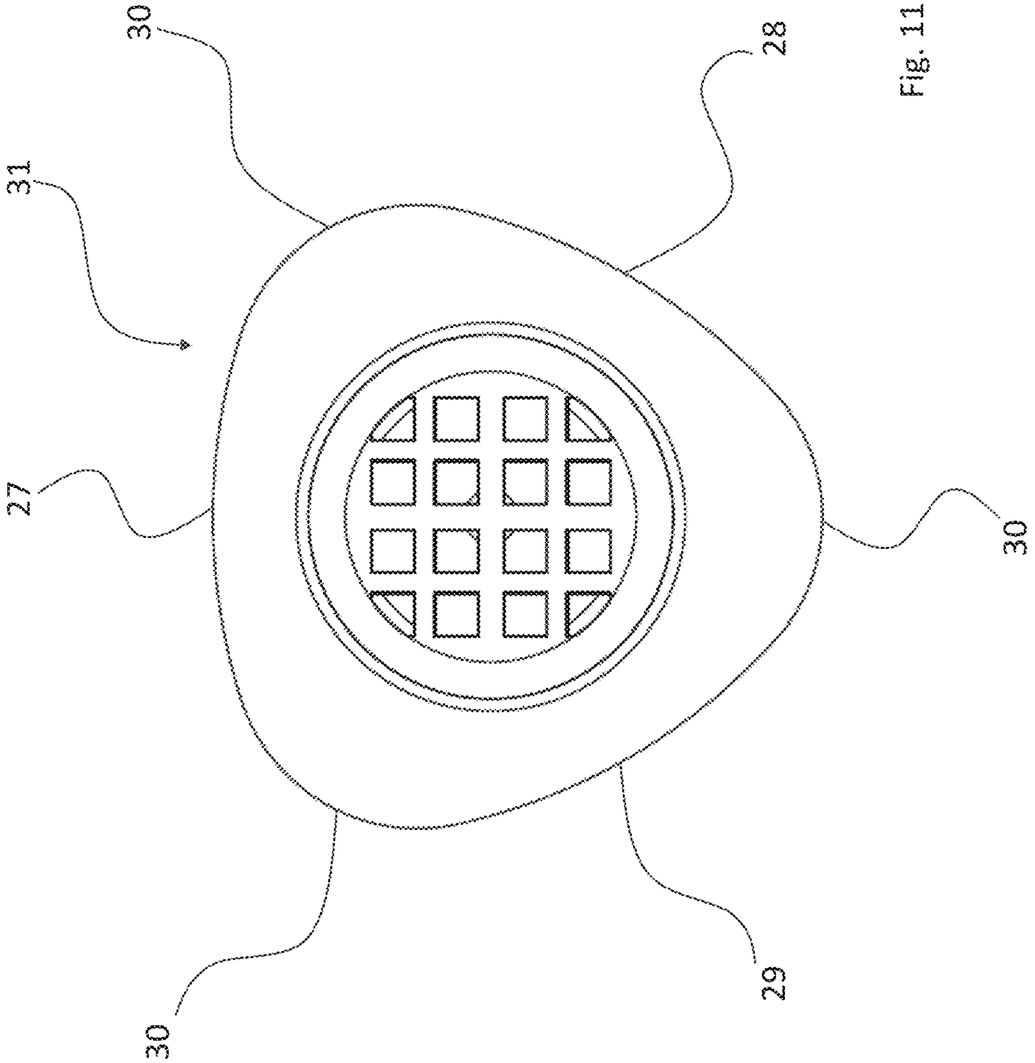
FIG. 11 shows a bottom view of an exemplary filter device.

FIG. 6 shows a second end view of a second end 3 of an exemplary filter device 31, where the filter device 31 comprises a collar 5, having a first collar surface 7. The collar 5 has a peripheral edge 26, where the peripheral edge 26 may have a triangular shape, or a three-point polygonal shape. Thus, the peripheral edge 26 has a first peripheral wall 27, second peripheral wall 28 and a third peripheral wall 29, where two adjacent walls are connected via a rounded corner 30. The peripheral edge may have a planar peripheral surface 16, second surface 6, transitional surface 17 and an inner edge 18 similar to what is shown in the embodiment of FIG. 1-5. All the features related to the filter device 1 of FIG. 1-5 may be applicable to the embodiment of the filter device 31 shown in FIG. 6. The only difference may be seen in the shape of the peripheral edge of the collar 5. The filter device 31 comprises a body as shown as body 2 in FIG. 1-5.

FIGS. 7-11 show a plurality of views of a filter device 31 like the one shown in FIG. 6, where the following description of the drawings will refer to any one of FIG. 6-11. The shape of the outer periphery of the collar 5 is substantially triangular, i.e. it is provided with a rounded first peripheral wall 27, rounded second peripheral wall 28 and a rounded third peripheral wall 29, where two adjacent walls 27, 28, 29 are connected via a rounded corner 30. The tapering 23 at the first end 3 is provided with an outer diameter 232 which is greater than the outer cross-sectional diameter of the outer surface 13 of the body 2.

The peripheral edge 8 comprises a transitional surface 17 which connects the second collar surface 6 with the first collar surface 7. The transitional surface 17 comprises a rounded section 172 which provides a rounded edge which will not hurt the user if pressed against a portion of the ear canal. The transitional surface 17 further comprises a flat section 172 which extends substantially parallel, preferably parallel, with the centre axis A, and which connects the first collar surface 7 to the rounded section 172. The thickness of the collar 5, i.e. the distance between the first and second collar surfaces 6, 7, may be substantially uniform in the area between the transitional surface 17 and the centre axis A. The width of the transitional surface 17, i.e. a diameter of the first collar surface 7 minus a diameter of the second collar surface 6, is preferably shorter than a diameter of the first collar surface divided by two minus a diameter of the second collar surface divided by two, i.e.

$$\frac{E-D}{2},$$

and preferably shorter than the outer diameter divided by four minus the collar diameter divided by four, $$\frac{E-D}{4}.$$

Also disclosed are hearing device cerumen filter devices according to any of the following items.

Item 1. Hearing device cerumen filter device comprising:

a body having a first end and a second end, the body comprising an inner surface defining a cavity, and an outer surface having an outer cross-sectional diameter, where the outer surface comprises a first support member positioned at a first distance from the first end, where the first support member has a first cross-sectional diameter, and the outer surface comprising a second support member positioned at a second distance from the first end, where the second support member has a second cross-sectional diameter;

a filter structure positioned within the cavity of the body; and a collar positioned at the second end of the body, the collar having a collar cross-sectional diameter.

Item 2. Hearing device cerumen filter device in accordance with item 1, where the first cross-sectional diameter and/or the second cross-sectional diameter are larger than the outer cross-sectional diameter.

Item 3. Hearing device cerumen filter device in accordance with any of items 1-2, where the first cross-sectional diameter and the second cross-sectional diameter are smaller than the collar cross-sectional diameter.

Item 4. Hearing device cerumen filter device in accordance with any of items 1-3, where the first cross-sectional diameter is larger than the second cross-sectional diameter.

Item 5. Hearing device cerumen filter device in accordance with any of items 1-4, where the first position is different from the second position.

Item 6. Hearing device cerumen filter device in accordance with any of items 1-5, where the first support member is positioned a predefined distance from the second support member.

Item 7. Hearing device cerumen filter device in accordance with any of items 1-6, where the cavity is a tubular cavity extending from the first end to the second end.

Item 8. Hearing device cerumen filter device in accordance with any of items 1-7, where the filter structure is positioned at a first end of the body.

Item 9. Hearing device cerumen filter device in accordance with any of items 1-8, where the filter structure comprises a plurality of rectangular openings providing fluid communication from the first end of the body and into the cavity.

Item 10. Hearing device cerumen filter device in accordance with any of items 1-9, where the filter structure has a filter structure area, where the openings comprise at least 70% of the filter structure area.

Item 11. Hearing device cerumen filter device in accordance with any of items 1-10, where a first end of the body has a tapered transition from the outer surface and to the inner surface.

Item 12. Hearing device cerumen filter device in accordance with any of items 1-11, where the inner surface may have an inner surface length and the outer surface may have an outer surface length, where the inner surface length is larger than the outer surface length.

Item 13. Hearing device cerumen filter device in accordance with any of items 1-12, where the collar comprises a first surface, where the first surface is planar.

Item 14. Hearing device cerumen filter device in accordance with any of items 1-13, where an outer periphery of the collar comprises a peripheral surface area, where the peripheral surface area is planar and where the plane is parallel to the outer surface of the body and/or the inner surface of the body.

Item 15. Hearing device cerumen filter device in accordance with item 14, where the peripheral surface area is connected to a second surface of the collar, where a transitional area between the peripheral surface and the second surface is rounded.

Item 16. Hearing device cerumen filter device in accordance with any of items 1-15, wherein the first support member is annular or at least semi-annular.

Item 17. Hearing device cerumen filter device in accordance with any of items 1-16, wherein the second support member is annular or at least semi-annular.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the words “a” or “an” preceding an element do not exclude the presence of a plurality of such elements.

It should further be noted that any reference signs do not limit the scope of the claims, that the exemplary embodiments may be implemented at least in part by means of both hardware and software, and that several “means”, “units” or “devices” may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1 Filter device (Hearing device cerumen filter device)
2 Body
3 First end
4 Second end
5 Collar
6 Second collar surface
7 First collar surface
8 Peripheral edge
9
10 Second opening
11 Cavity
12 Inner surface
13 Outer surface
14 First support member
15 Second support member
16 Planar peripheral surface
17 Transitional surface
18 Inner edge
19 Filter structure
20 Pillars
21 Openings
22 Filter structure area
23 Tapered surface
24 First filter surface
25 Second filter surface
A Centre axis
B First diameter
C Second Diameter
D outer diameter
E Collar diameter

The invention claimed is:

1. A cerumen filter device for a hearing device, the cerumen filter device comprising:

a body having a first end and a second end, the body comprising:

an inner surface defining a cavity, and an outer surface having an outer cross-sectional dimension, where the outer surface comprises a first support member at a first distance from the first end, wherein the first support member is annular and has a first cross-sectional dimension, the outer surface further comprising a second support member positioned at a second distance from the first end, where the second support member has a second cross-sectional dimension;

a filter structure within the cavity of the body; and a collar at the second end of the body, the collar having a collar cross-sectional dimension;

where the first cross-sectional dimension, and the second cross-sectional dimension, are smaller than the collar cross-sectional dimension.

2. A cerumen filter device for a hearing device, the cerumen filter device comprising:

a body having a first end and a second end, the body comprising:

an inner surface defining a cavity, and an outer surface having an outer cross-sectional dimension, where the outer surface comprises a first support member at a first distance from the first end, wherein the first support member is annular and has a first cross-sectional dimension, the outer surface further comprising a second support member positioned at a second distance from the first end, where the second support member has a second cross-sectional dimension;

a filter structure within the cavity of the body; and a collar at the second end of the body, the collar having a collar cross-sectional dimension;

wherein the second support member is annular, and wherein the first cross-sectional dimension and the second cross-sectional dimension are larger than the outer cross-sectional dimension.

3. The cerumen filter device in accordance with claim 1, wherein the first cross-sectional dimension is larger than the second cross-sectional dimension.

4. The cerumen filter device in accordance with claim 1, wherein the first position is different from the second position.

5. The cerumen filter device in accordance with claim 1, wherein the first support member is at a predefined distance from the second support member.

6. The cerumen filter device in accordance with claim 1, where the cavity is a tubular cavity extending from the first end to the second end.

7. The cerumen filter device in accordance with claim 1, where the filter structure is at the first end of the body.

8. The cerumen filter device in accordance with claim 1, where the filter structure comprises a plurality of rectangular openings.

9. The cerumen filter device in accordance with claim 8, wherein the rectangular openings are configured to provide fluid communication with the cavity.

10. A cerumen filter device for a hearing device, the cerumen filter device comprising:

a body having a first end and a second end, the body comprising:

an inner surface defining a cavity, and an outer surface having an outer cross-sectional dimension, where the outer surface comprises a first support member at a first distance from the first end, wherein the first support member is annular and has a first cross-sectional dimension, the outer surface further comprising a second support member positioned at a second distance from the first end, where the second support member has a second cross-sectional dimension;

a filter structure within the cavity of the body; and a collar at the second end of the body, the collar having a collar cross-sectional dimension;

wherein the filter structure has a plurality of openings, and a filter structure area; and wherein the openings comprise at least 70% of the filter structure area.

11. The cerumen filter device in accordance with claim 1, wherein the first end of the body has a tapered transition from the outer surface and to the inner surface.

12. The cerumen filter device in accordance with claim 1, wherein the inner surface has an inner surface length and the outer surface has an outer surface length, and wherein the inner surface length is larger than the outer surface length.

13. The cerumen filter device in accordance with claim 1, wherein the collar comprises a first surface, where the first surface is planar.

14. The cerumen filter device in accordance with claim 1, wherein an outer periphery of the collar comprises a first surface, wherein the first surface is planar, and wherein the first surface is parallel to the outer surface of the body and/or the inner surface of the body.

15. The cerumen filter device in accordance with claim 14, wherein the first surface of the collar is connected to a second surface of the collar, where a transitional area between the first surface of the collar and the second surface of the collar is curvilinear.

16. The cerumen filter device in accordance with claim 2, wherein the first cross-sectional dimension is larger than the second cross-sectional dimension.

17. The cerumen filter device in accordance with claim 2, wherein the first position is different from the second position.

18. The cerumen filter device in accordance with claim 2, where the filter structure is at the first end of the body.

19. The cerumen filter device in accordance with claim 2, wherein the first end of the body has a tapered transition from the outer surface and to the inner surface.

20. The cerumen filter device in accordance with claim 2, wherein the inner surface has an inner surface length and the outer surface has an outer surface length, and wherein the inner surface length is larger than the outer surface length.

* * * * *